April 10, 1962  S. L. HART  3,029,384
ELAPSED TIME INDICATOR AND CONTROLLER
Filed Dec. 23, 1960

INVENTOR.
Sylvan L. Hart
BY
ATTORNEY

United States Patent Office 3,029,384
Patented Apr. 10, 1962

3,029,384
ELAPSED TIME INDICATOR AND CONTROLLER
Sylvan L. Hart, 320 W. 87th St., New York, N.Y.
Filed Dec. 23, 1960, Ser. No. 77,868
7 Claims. (Cl. 324—68)

The present invention relates to elapsed time indicators generally and more particularly to an elapsed time indicator of the type adapted for use with electrical and electronic devices and the like.

It has heretofore been known to provide an elapsed time indicator utilizing the principle of electrolysis or electrolytic deposition to determine the elapsed time that a given voltage has been applied to a unit being measured. In accordance with one such previously known device the time that such voltage has been applied is measured and indicated by a visual indication of the amount of the electrode removed by the electrolytic action of the electrolytic cell and deposited upon a collector disposed therein. A detailed description of such a device may be obtained by reference to U.S. Patent Re. 24,190 to Leonard J. Kroko issued July 31, 1956.

In a device such as described in the aforesaid Kroko patent there is the disadvantage of effecting visual readings with great difficulty due to the extremely small initial distance between the electrode and cathode. Further, as the gap increases with use of the cell an error is introduced resulting from a decrease in the rate of electrodeposition.

Accordingly, it is an object of the present invention to provide an elapsed time indicator which is of simple construction and which may be read without difficulty and without hazard of error. It is another object of the invention to provide an elapsed time indicator of the electrolytic cell type capable of simultaneously controlling desired external electric circuits whereby preselected circuits may be placed into or removed from operation after a predetermined time as measured by the said indicator. Other objects and advantages of the invention will become apparent upon reading the following description.

According to the present invention there is provided an elapsed time indicator and controller of the electrolytic cell type adapted to be connected in a circuit provided with a source of electric current and a unit to be measured, comprising an electrolytic cell having at least a segment of the cover thereof formed of transparent material, said segment being provided with a calibrated scale; a pair of resilient means positioned within said cell in opposed relationship, said resilient means being respectively connected at one end to opposite ends of said cell and at the other end to a pointer disposed therebetween, the resilient strength of a first of said resilient means being sufficient to neutralize the resilient strength of the second of said resilient means tending to urge said pointer theretowards; a cathode being positioned within said cell about said first resilient means and in spaced relationship therewith; said first resilient means being formed of metallic material which, when said indicator is placed into operation, will release molecules for transit to said cathode to form a coating of said material thereon whereby the resilient strength of said first resilient means is decreased and said second resilient means urges said pointer theretowards; and an electrolyte within the said cell.

The invention will now be described, by way of example, with reference to the accompanying drawings in which.

Figure 1:
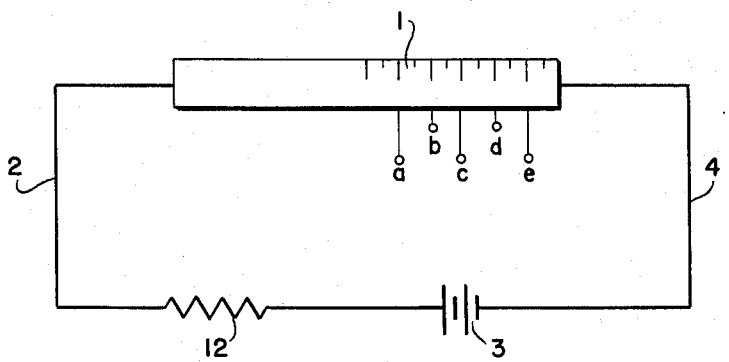
FIG. 1 is a schematic illustration showing the elapsed time indicator of the present invention and a circuit containing same.

FIGURE 1 of the drawings shows an electrolytic cell, constructed in accordance with the present invention, and hereinafter described in detail, interposed in an electric circuit. The cell 1 is connected by line 2 to a source of current 3 such that the anode of the cell is positively charged, the cathode 10 of the cell being connected by line 4 to the low potential side of said current source. Resistance 12 is provided as a current limiting factor as will be well known in the electrical art. Generally direct current will be supplied by the aforesaid current source; however when a source of alternating current is to be employed it will be necessary, as is well known in the art, to position a rectifier in the circuit. The unit to be measured, e.g. a motor or some other device to be timed may be interposed at any point in the circuit.

Figure 2:
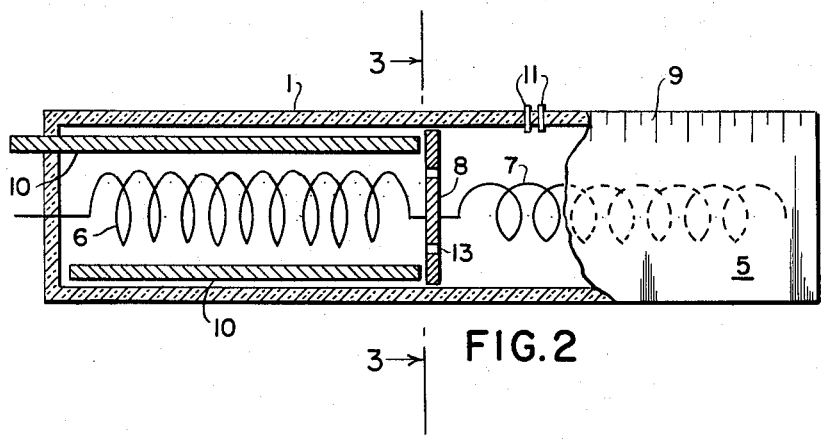
FIG. 2 is a sectional view of a presently preferred indicator.
Figure 3:
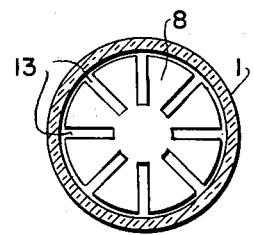
FIG. 3 is a sectional view taken along line III—III of FIG. 2.

FIGURE 2 of the drawings illustrates a presently preferred electrolytic cell constructed in accordance with this invention. An elongated outer cover or envelope 5 is provided preferably of cylindrical configuration and closed at both ends. A portion of the said cover is provided with a graduated scale 9 calibrated in units bearing a relationship with the elapsed time being measured. At least that portion of the cover provided with the scale should be formed of transparent material, and it is presently preferred that the cover in its entirety be constructed of glass, plastic or equivalent transparent material. Within the envelope a first resilient means such as coil spring 6 is positioned adjacent one end thereof, a first end of said spring being connected to said one end of the cover. A second resilient means such as coil spring 7 is positioned within said cover adjacent its other end with a first end of said second spring being connected to said other end of the cover. Between said springs and also within said cover a pointer 8 is positioned which pointer is preferably disc shaped. Springs 6 and 7 have their other ends secured to opposite sides of said pointer and exert opposing forces on said pointer. The spring 6 is designed with a spring constant such that before placing said cell into operation it is capable of balancing the force of spring 7 whereby the pointer is maintained in a given axial position within the cover.

The scale 9 is desirably calibrated such that prior to being placed into use, and with springs 6 and 7 in equilibrium, the pointer will indicate a zero reading on the scale. Also within cover 5 and enclosing spring 6 is cathode sleeve 10. A suitable electrolyte is provided within the cover and is of a type well known in the art, e.g. the acid-type. A presently preferred electrolyte is formed of copper-sulfate. Along the axial length of scale 9 or a segment thereof one or more electrically conductive terminals 11 are mounted which are connected to preselected external circuits. Alternatively the pointer may be connected as the adjustable arm or wiper in a rheostat circuit as is well known.

Axial movement of pointer 8 within the cover is effected, when the cell is placed in operation, by an imbalance in the forces exerted by springs 6 and 7. Thus, a decrease in the compressive strength exerted by spring 6 causes an upset in the equilibrium between said spring and spring 7. Spring 6 is constructed of a metal which will plate upon cathode 10 when current flows through the cell. Desirably this spring, which becomes the anode of the cell, is made of a copper-beryllium alloy although any metal or alloy may be employed which will readily electrodeposit upon the cathode sleeve under the operating conditions for the cell. As molecules of the metal which forms spring 6 are removed by electrolytic action and plate upon the cathode the spring is weakened and the constant force of spring 7 urges the pointer towards that end of cover 5 to which spring 7 is secured. Spring 7 should be formed from material which is inert to the electrodeposition process. Stainless steel has been found particularly desirable. The position of pointer 8 within the cover may easily be observed by viewing the scale 9. As hereinbefore stated, movement of pointer 8 will cause the desired circuit or circuits a, b, c, d and e (see FIG. 1) to be placed into operation when the pointer contacts the respective terminal(s) 11.

The pointer, as previously stated, may be disc-shaped and may also desirably be provided with either hole-like apertures or slots 13 extending completely therethrough. These apertures or slots, whichever are employed, are for the purpose of minimizing the resistance of the electrolyte to axial movement of the pointer within the cell, electrolyte thus being permitted to flow through the apertures to the other side of the pointer as the pointer advances within the cover. The pointer should be formed from material which will enable it to be smoothly drawn through the cell and which will establish the proper electrical contact with terminals 11. The pointer may also, if desired, be formed by an enlarged loop or section of the coil spring 7.

The cathode is, as will be obvious to those skilled in the art, constructed of a material which will receive the molecules removed from the anode to form a plating or coating thereon. The cathode desirably extends at least the full axial extent of spring 6 but preferably is of somewhat greater length since spring 6 will be extended during operation of the cell. It is presently preferred to construct the cathode sleeve in the form of an open cylinder.

Although one specific embodiment of the present invention has been described and illustrated in the drawings for purposes of explaining the invention, it is obvious that the invention is not limited thereto.

What I claim is:

1. An elapsed time indicator and controller of the electrolytic cell type adapted to be connected in a circuit provided with a source of electric current and a unit to be measured, comprising an electrolytic cell having at least a segment of the cover thereof formed of transparent material, said segment being provided with a calibrated scale; a pair of resilient means positioned within said cell in opposed relationship, said resilient means being respectively connected at one end to opposite ends of said cell and at the other end to a pointer disposed therebetween, the resilient strength of a first of said resilient means being sufficient to neutralize the resilient strength of the second of said resilient means tending to urge said pointer theretowards; a cathode being positioned within said cell about said first resilient means and in spaced relationship therewith; said resilient means being formed of metallic material which, when said indicator is placed into operation, will release molecules for transit to said cathode to form a coating of said material thereon whereby the resilient strength of said first resilient means is decreased and said second resilient means urges said pointer theretowards; and an electrolyte within the said cell.

2. An elapsed time indicator as claimed in claim 1, wherein said first and second resilient means comprise first and second coil springs.

3. An elasped time indicator as claimed in claim 2, wherein at least one electrically conductive terminal is mounted in the segment of said cover provided with said scale, said at least one terminal being connected to one or more preselected external electric circuits.

4. An elapsed time indicator and controller of the electrolytic cell type adapted to be connected in a circuit provided with a source of electric current and a unit to be measured, comprising an electrolytic cell having a cover formed of transparent material, said cover being provided with a calibrated scale; a pair of coil springs positioned within said cell in opposed relationship, said springs being respectively connected at one end to opposite ends of said cell and at the other end to a disc-shaped pointer disposed between said springs, the resilient strength of a first of said springs being sufficient to neutralize the resilient strength of the second of said springs tending to urge said pointer theretowards; a cathode sleeve being positioned within said cell about said first spring and in spaced relationship therewith; said first spring being formed of metallic material which, when said indicator is placed into operation, will release molecules for transit to said cathode to form a coating of said material thereon whereby the resilient strength of said first spring is decreased and said second spring urges said pointer theretowards; and an electrolyte within the said cell.

5. An elapsed time indicator as claimed in claim 4, wherein said sleeve comprises an open cylinder arranged concentrically about said first spring.

6. An elapsed time indicator as claimed in claim 5, wherein at least one electrically conductive terminal is mounted in said cover along the path of movement of said pointer, said at least one terminal being connected to one or more preselected external electric circuits.

7. An elapsed time indicator and controller of the electrolytic cell type adapted to be connected in a circuit provided with a source of electric current and a unit to be measured, comprising an electrolytic cell having a cover formed of transparent material, said cover being provided with a calibrated scale; a pair of coil springs positioned within said cell in opposed relationship, said springs being respectively connected at one end to opposite ends of said cell and at the other end to a disc-shaped pointer disposed between said springs, the resilient strength of a first of said springs being sufficient to neutralize the resilient strength of the second of said springs tending to urge said pointer theretowards; a cathode sleeve being positioned within said cell about said first spring and in spaced relationship therewith; said first spring being formed of copper-beryllium alloy which, when said indicator is placed into operation, will release molecules for transit to said cathode to form a coating of copper thereon whereby the resilient strength of said first spring is decreased and said second spring urges said pointer theretowards; and a copper-sulfate electrolyte within the said cell.

No references cited.